United States Patent [19]

Suko et al.

[11] Patent Number: 4,611,281

[45] Date of Patent: Sep. 9, 1986

[54] APPARATUS FOR ANALYZING MICROPROCESSOR OPERATION

[75] Inventors: Shouichi Suko, Tokyo; Hirohisa Hoshino, Tama, both of Japan

[73] Assignee: Iwatsu Electric Co., Ltd., Tokyo, Japan

[21] Appl. No.: 611,839

[22] Filed: May 18, 1984

[30] Foreign Application Priority Data

May 24, 1983 [JP] Japan ................... 58-90073

[51] Int. Cl.⁴ ........................................... G06F 11/00
[52] U.S. Cl. ........................................ 364/200; 371/16
[58] Field of Search ... 364/200 MS File, 900 MS File; 371/15-19

[56] References Cited

U.S. PATENT DOCUMENTS

| | | | |
|---|---|---|---|
| 3,879,712 | 4/1975 | Edge et al. | 364/200 |
| 4,063,311 | 12/1977 | Jeremiah et al. | 364/900 |
| 4,275,464 | 6/1981 | Schmidt | 371/15 |
| 4,315,313 | 2/1982 | Armstrong et al. | 364/200 |
| 4,392,208 | 7/1983 | Burrows et al. | 364/900 |
| 4,424,576 | 1/1984 | Lange et al. | 371/16 |
| 4,453,093 | 6/1984 | Boudreau | 371/16 |
| 4,517,671 | 5/1985 | Lewis | 371/16 |
| 4,535,456 | 8/1985 | Bauer et al. | 371/16 |

OTHER PUBLICATIONS

Tom Williams, "Logic Analyzers Rise to the Challenge of Microprocessors", Computer Design, Apr. 5, 1983, pp. 155-164.
J. Smith, "A Logic State Analyzer for Microprocessor Systems" Hewlett Packard, 1977 pp. 2-11.
T. Saponas, "Firmware for a Microprocessor Analyzer".
G. Haag, "A Logic State Analyzer for Evaluating Complex State Flow", Hewlett-Packard, 1978.

Primary Examiner—David Y. Eng
Attorney, Agent, or Firm—Paul & Paul

[57] ABSTRACT

The apparatus for analyzing the operation of a microprocessor provides a switch for instructing the commencement of a data search and a switch for specifying an internal register of the microprocessor, and when a data search is commenced, searches for and displays the data when an instruction is executed by which the contents of the specified internal register is changed.

3 Claims, 10 Drawing Figures

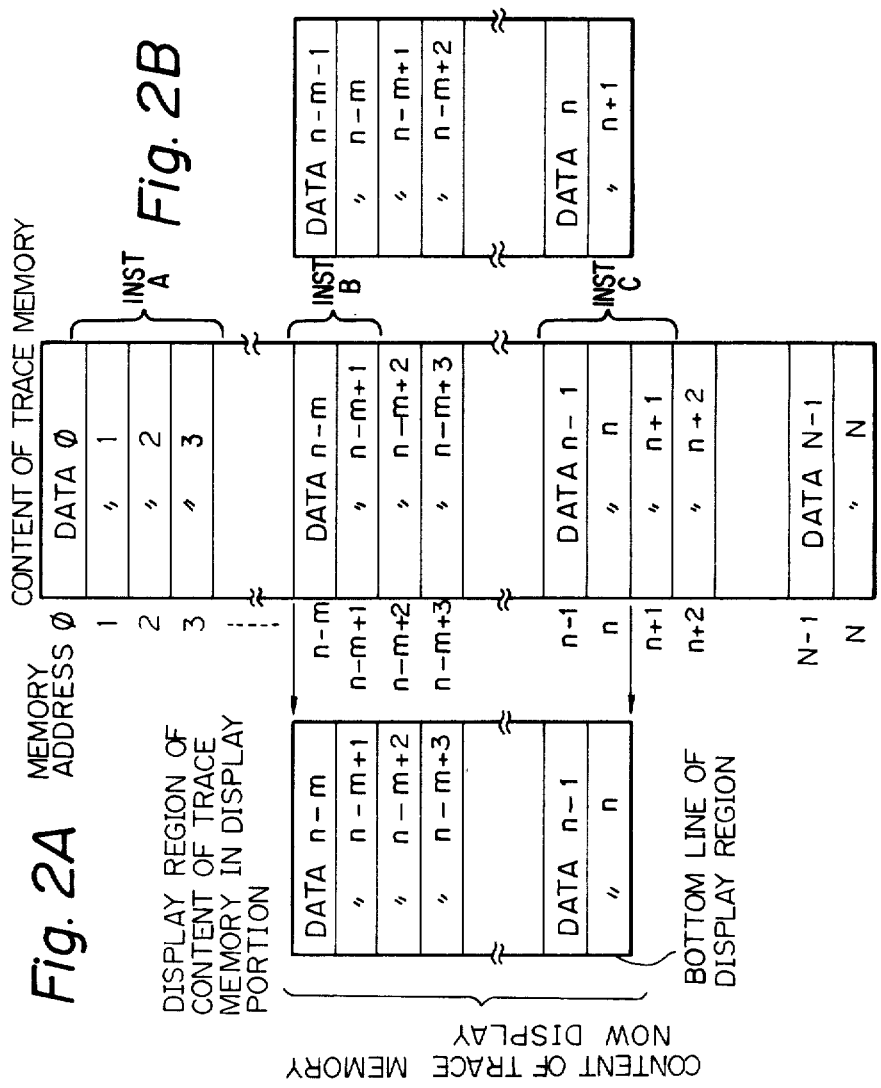

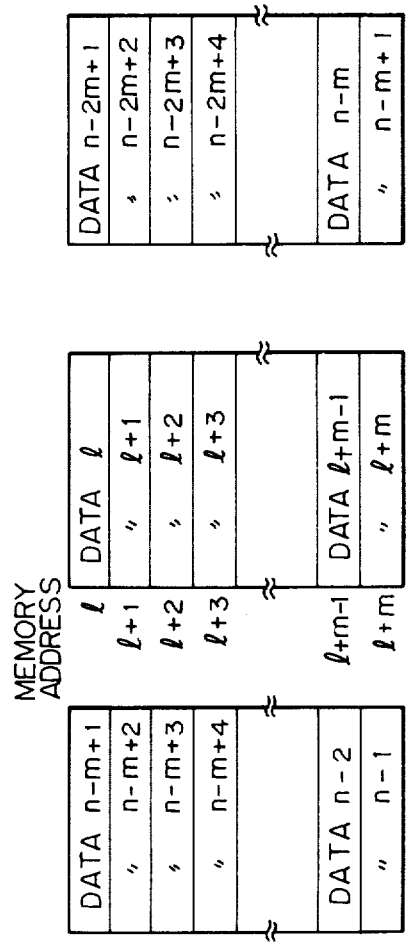

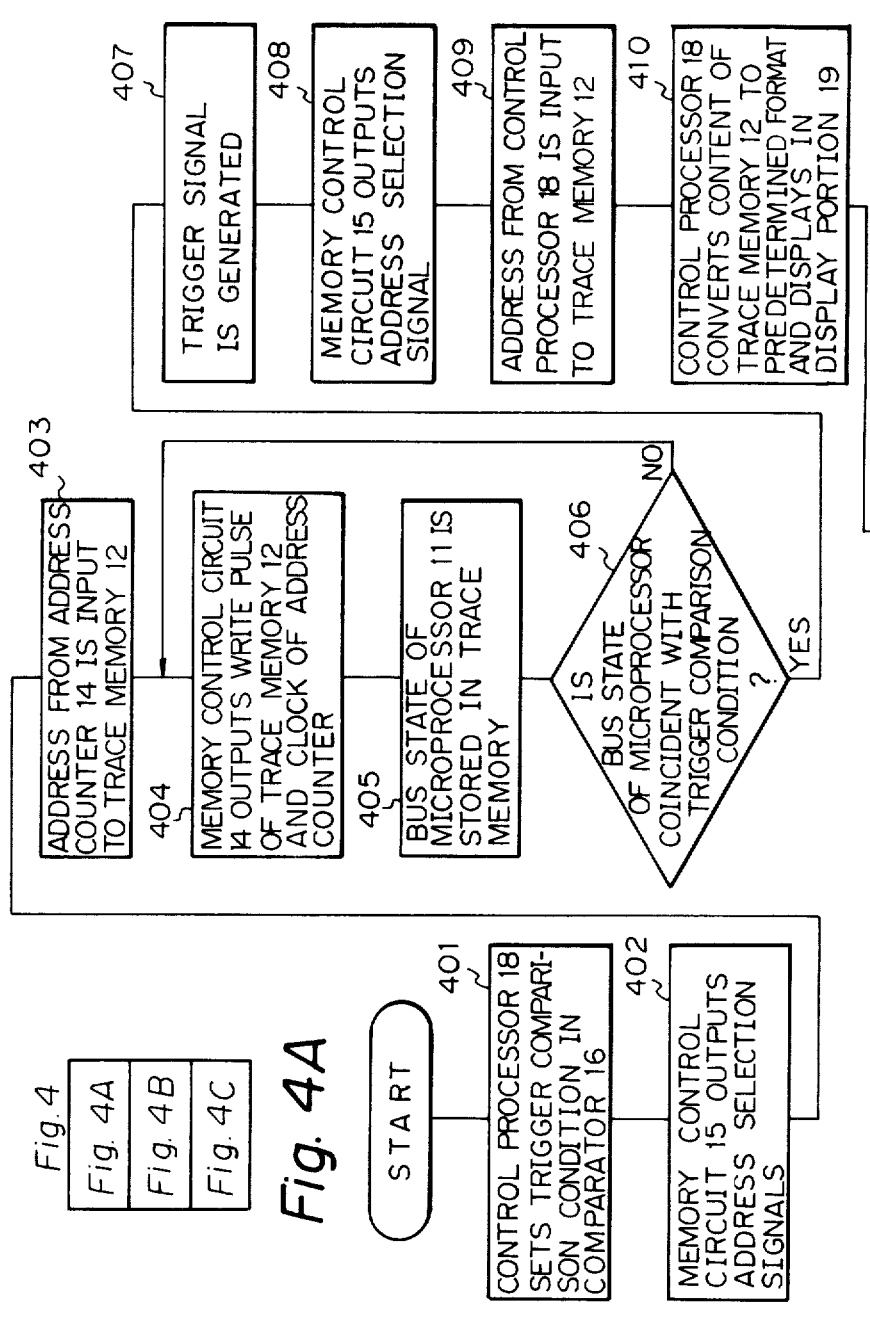

APPARATUS FOR ANALYZING MICROPROCESSOR OPERATION

BACKGROUND OF THE INVENTION

1. Field of the Invention

The present invention relates to an apparatus for analyzing a program, checking the operation, and diagnosing faults in the microprocessor used in an apparatus such as a logic analyzer or microprocessor analyzer, etc.

2. Description of the Prior Art

In an apparatus for analyzing the operation of a microprocessor, when searching for specified trace data in the content of a trace memory, the display portion of the apparatus is used as follows: the picture is shifted by one line by operating scrolling up or scrolling down switches, i.e., after the address of the trace memory is input, the trace data displayed is examined to determine whether or not the specified trace data is displayed. When the specified trace data cannot be found in the displayed picture, the picture is shifted by one line by scrolling up or by scrolling down. The above operation is repeated until the specified trace data can be found. However, this operation requires much time and can be troublesome.

In particular, when analyzing a program, checking the operation, or diagnosing a fault in a microprocessor by using such an apparatus, it is frequently necessary to check at which point an internal register of a microprocessor is changed. Usually, many instructions exist in which the internal register of the microprocessor is changed, and frequently, the bus state of the microprocessor becomes a combination of several states when one such instruction is executed. Therefore, in the trace memory for storing the bus state, a combination of a plurality of trace data corresponding to each instruction is stored in the order by which the instructions are executed. To search for the trace data of the bus state when an instruction is given by which one of the internal registers of the microprocessor may be changed, it is necessary to not only search for the one specified data, but also to parallely shift the picture displayed or to repeat the operation for switching to the next picture display by determining in which of the combinations of the plurality of the trace data corresponding to the plurality of instruction by which the one of the internal registers may be changed, the trace data is coincident. This operation requires much time and can be very troublesome.

SUMMARY OF THE INVENTION

An object of the present invention is to provide an apparatus for analyzing the operation of the microprocessor in which such drawbacks of the prior art are eliminated.

Another object of the invention is to provide an apparatus for analyzing the operation of the microprocessor which provides a means for instructing commencement of a trace data search and a means for specifying the internal register of the microprocessor. The apparatus of the present invention can search and display, out of the trace data which indicates the state of the various signals of the microprocessor stored in the trace memory, the combination of the trace data when an instruction by which the specified internal register from the internal registers of the microprocessor is changed is executed.

The above-mentioned object can be achieved by providing an apparatus for analyzing an operation of a microprocessor including: a trace memory storing various signals of the microprocessor in a system to be tested; an address counter specifying a stored address of the trace memory by inputting desired clock pulses; and a setting condition input apparatus which inputs various setting conditions.

The apparatus includes a trigger comparator which compares the various signals of the microprocessor and a previously set trigger comparison condition, and which generates a coincident pulse (a trigger signal) when the various signals and trigger conditions are coincident. At this point, a memory control circuit outputs a write pulse to the trace memory by a start signal and a clock pulse to the address counter, and receives the coincident pulse (trigger signal) from the trigger comparator to stop the write pulse to the trace memory and the output of the clockpulse to the address counter.

A display apparatus displays the various setting conditions input from the setting condition input apparatus and the content stored in the trace memory, and a control processor outputs the various setting conditions from the setting condition input apparatus to the trigger comparator, the memory control circuit, and the display apparatus, outputs an address of the trace memory, and reads the desired trace data from the trace memory, to output the trace data to the display apparatus.

An address selection circuit switches an address to the trace memory from the control processor and an address to the trace memory from the address counter so that, after the various signals from the microprocessor are stored in the trace memory, the various signals are displayed by the display apparatus in a predetermined form.

The apparatus also comprises data search switches which instruct the commencement of a search operation and a switch for specifying which internal register of the microprocessor in the system to be tested is connected to the input of the control processor thereby searching automatically for trace data of the signal of the bus state of the microprocessor when the instruction is given by which the specified internal register is changed from the trace memory, and outputting the trace data to the display apparatus.

Further features and advantages of the present invention will be apparent from the ensuing description with reference to the accompanying drawings to which, however, the scope of the invention is in no way limited.

BRIEF DESCRIPTION OF THE DRAWINGS

FIG. 2A is a diagram showing the relationships between the content of the trace memory, the address, and the content displayed in the display region, for the content of the trace memory in the display portion;

FIG. 2B is a diagram showing when the display shown in FIG. 2A is scrolled up by one line;

FIG. 2C is a diagram showing when the display shown in FIG. 2A is scrolled down by one line;

FIG. 2D is a diagram of the display obtained by specifying the address of the memory;

FIG. 2E is a diagram showing the data displayed when the search switch of the present invention is operated;

FIGS. 4(A), 4(B) and 4(C) are flow-charts explaining the operation of the embodiment shown in FIG. 3.

DESCRIPTION OF THE PREFERRED EMBODIMENTS

Figure 1:
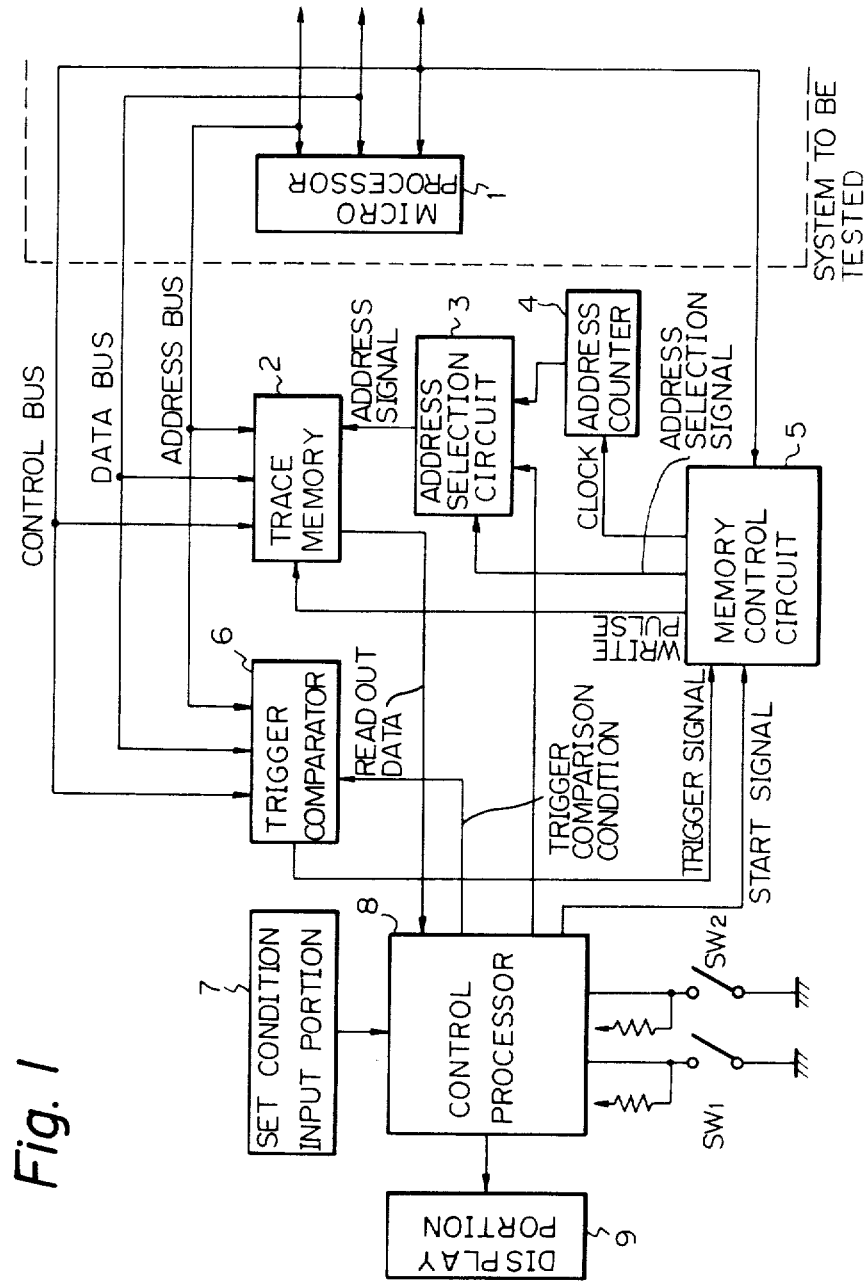
FIG. 1 is a block diagram of one example of the conventional apparatus for analyzing the operation of the microprocessor.

FIG. 1 is a block diagram of the conventional apparatus for analyzing the operation of a microprocessor. In FIG. 1, when a start signal is supplied from a control processor 8 to a memory control circuit 5, the memory control circuit 5 outputs an address selection signal to an address selection circuit 3 by a control bus signal from a microprocessor 1, so that the address from an address counter 4 is supplied to a trace memory 2. At the same time, the memory control circuit 5 outputs a clock pulse for the address counter 4 and a write pulse for the trace memory 4 by the control bus signal from the microprocessor 1. The signals in a data bus, an address bus, and a control bus of the microprocessor of the system to be tested are written into the trace memory. The trigger comparison condition previously set by the control processor 8 is compared with the condition of the signals of the data bus, address bus, and control bus of the microprocessor 1 in the system to be measured by a trigger comparator 6. When these two conditions are coincident, a coincident pulse (hereinafter called a trigger signal) is generated from the trigger comparator 6. By this trigger signal, the memory control circuit 5 inhibits the clock pulse to the address counter 5 and the write signal to the trace memory 2, so that the write operation of the bus condition is finished and the bus condition of the microprocessor prior to the generation of trigger signal is stored in the trace memory 2. The stored bus condition is converted by the control processor 8 into the hexadecimal code or the mnemonic code of the microprocessor to be tested and displayed on a display apparatus, such as a CRT.

The amount of the information displayed in the display portion at the same time is usually very much smaller than the capacity of the trace memory for storing the bus condition, thus the trace data displayed at one time in the display region for the content of the trace memory in the display portion is only a small part of the content of the trace memory, as shown in FIG. 2A. That is, when the content of the trace memory is assumed as N, the address of the trace data (DATA $\phi$) stored in the fastest time as $\phi$, the address of the trace data (DATA N) stored at the latest time (the newest time) as N, the number of lines in the display region for display of the content of the trace memory in the display portion as m, and the display data in the last line of the display region for the content of the trace memory in the display portion now in the display state as DATA n (the content of the address), only the data between addresses n and n−m among the addresses $\phi$∼N are displayed, as shown in FIG. 2A. Therefore, as shown in FIG. 1, a picture scroll up switch $SW_1$ which parallelly shifts the content displayed in the display region for the content of the trace memory in the display system upward by one line of the picture, and a picture scroll down switch $SW_2$ which parallelly shifts the picture downward are provided, and the picture is parallelly shifted upward or downward by one line, so that the arbitrary data in the trace memory is displayed. FIG. 2B shows the display obtained by scrolling up one line of the picture from the state shown in FIG. 2A, and FIG. 2C, shows the display when the state shown in FIG. 2A is scrolled down by one line of the picture. In another method, the address of the trace memory is input from the setting condition input portion, etc., and the data is displayed in such a manner that the address data is placed on the top most line of the display region of the memory. An example of this display is shown in FIG. 2D wherein 1 is input as the address of the trace memory.

For example, in FIG. 2A, when instructions by which the internal register x is changed are assumed as A, B, the combination of the data corresponding to instruction A is assumed as DATA 1, DATA 2, and DATA 3, and the combination of the data corresponding to instruction B is assumed as DATA n−m and DATA n−m+1, two combinations of the data should be searched from the data DATA $\phi$∼N stored in the trace memory. This requires more time than that required for searching one specified trace data, and is more troublesome.

Figure 3:
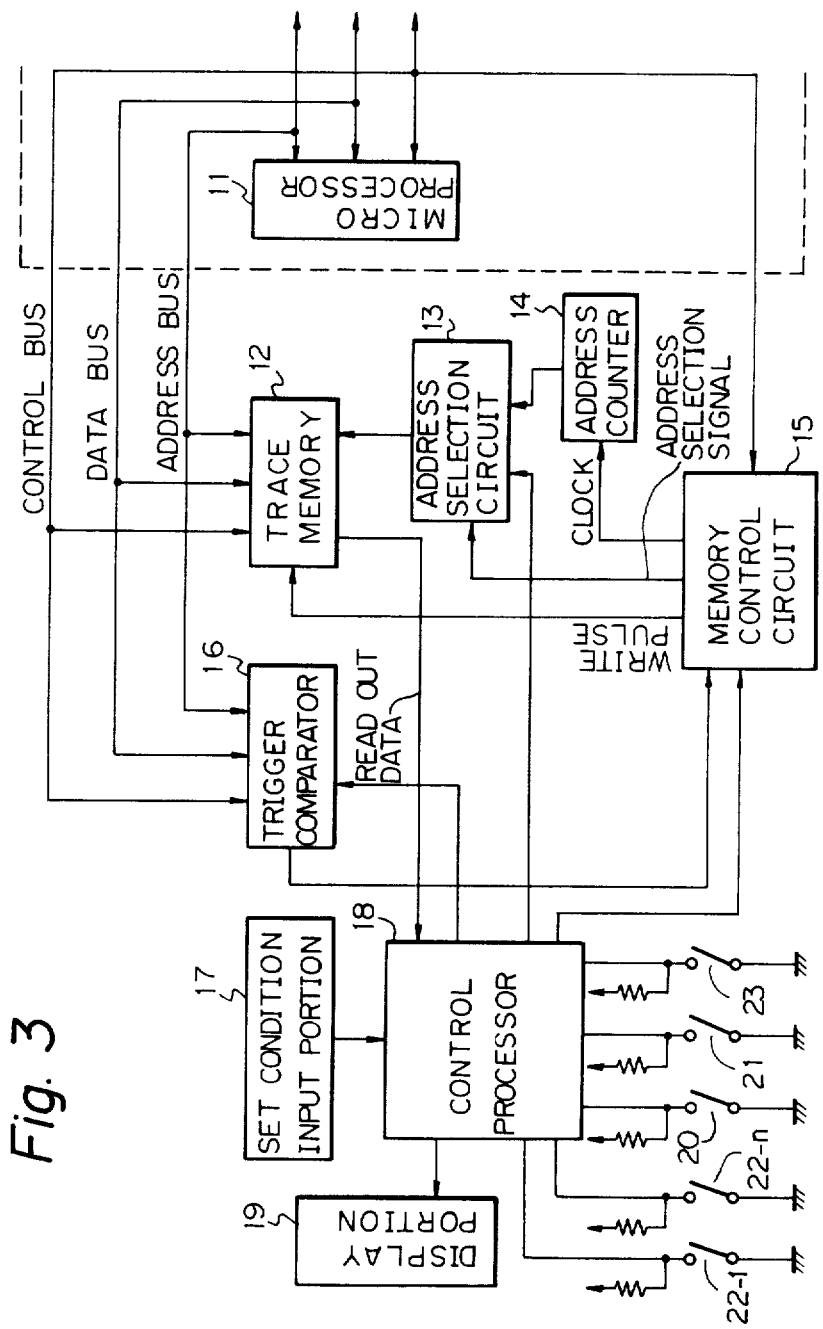
FIG. 3 is a block diagram of one embodiment of the apparatus for analyzing the operation of the microprocessor according to the present invention.

FIG. 3 is a block diagram of the apparatus of one embodiment of the present invention. In FIG. 3, 11 denotes a microprocessor in the system to be tested, 12 denotes a trace memory storing the signals of an address bus, a data bus, and a control bus of the microprocessor in the system to be tested, or the converted signals thereof, 13 denotes an address selection circuit which selects the address of the trace memory 12, 14 denotes an address counter which specifies the address of the trace memory 12, 15 denotes a memory control circuit which generates a write pulse to the trace memory 12 and a clock pulse to the address counter 14 and outputs an address selection signal to the address selection circuit 13, 16 denotes a trigger comparator which compares the trigger comparison condition set previously to the desired value and the bus state of the microprocessor 11 and outputs the trigger signal when these are coincident, 17 denotes a set condition input portion which inputs various set conditions such as a trigger comparison condition, 18 denotes a control processor which outputs the set condition or a start signal from the set condition input portion to the trigger comparator 16 or the memory control circuit 15, or reads the content of the trace memory 14 and converts the same to a desired data form for output to the display portion, 20 denotes a picture scroll up switch which parallelly shifts the content of the trace memory 12 converted to the desired data by the control processor 18 and displayed on the display portion 19, upward by one line, 21 denotes a picture scroll down switch which parallelly shifts the content of the trace memory 12 converted to the desired data by the control processor 18 and displayed on the display portion 19 downward by one line, 22−1 to 22−n denote switches which specify the internal register of the microprocessor 11, 23 denotes a data search switch connected to the control processor which searches the combination of the trace data to be stored in the trace memory 12 when the microprocessor 11 executes the instruction changing the specified internal register, starting in order from the data displayed in the bottom line of the display portion 19, and when the search combination of the data is found in the trace memory 12, displays that trace data on the bottom line of the display area of the memory 12 in the trace data display portion 19.

Figure 4B:
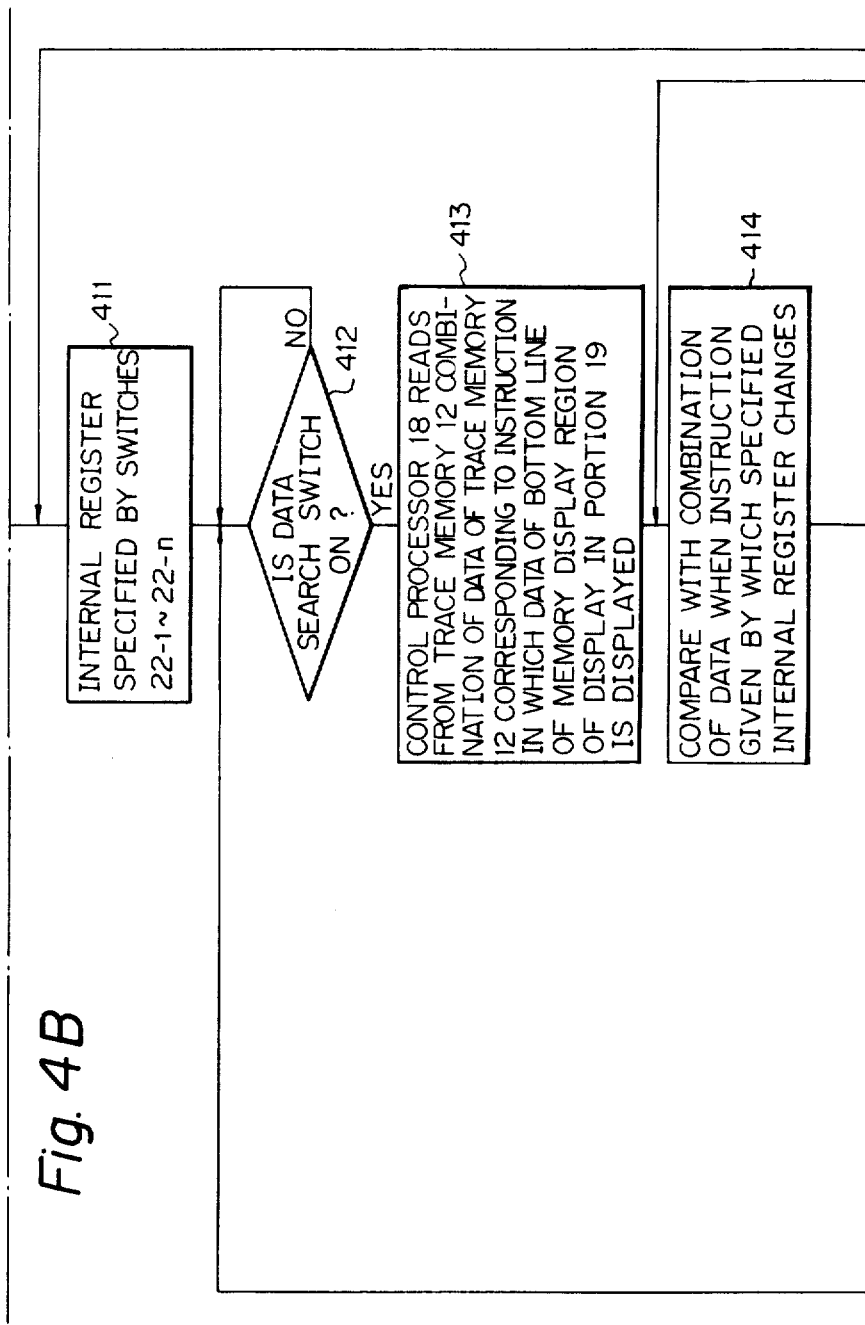
Figure 4C:
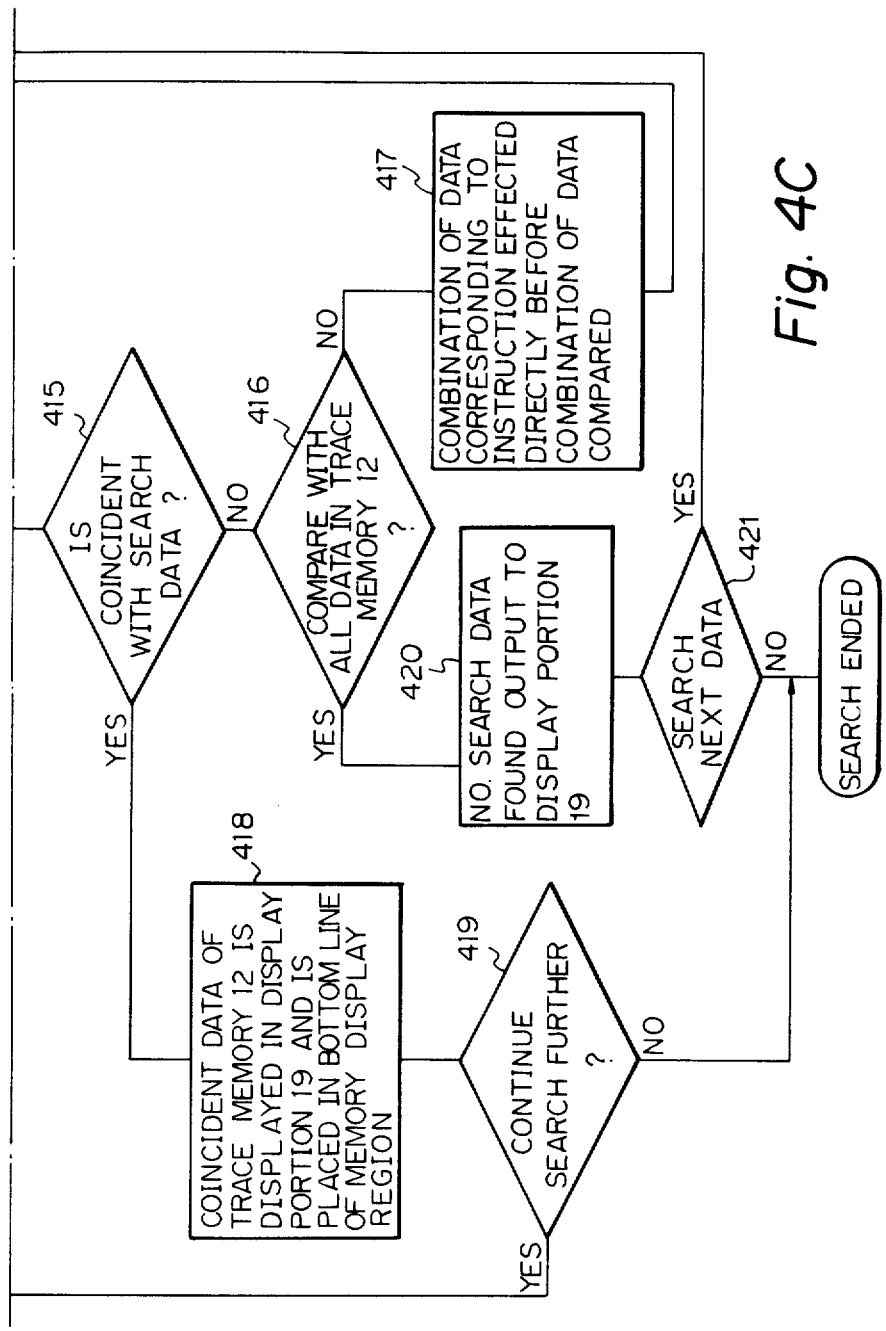

Next, the operation of the embodiment shown in FIG. 3 will be explained by referring to the flow-chart shown in FIGS. 4(A), 4(B) and 4(C).

At the start of the operation, the control processor 18 sets the trigger comparison condition into the trigger comparator 16 and generates the start signal (401). When the start signal is supplied to the memory control circuit 15, the memory control circuit 15 outputs the address selection signal to the address selection circuit 13 by the signal of the control bus of the microprocessor 11 (402), so that the address from the address counter 14 is input to the trace memory (403) and outputs the clock pulse to the address counter and the write pulse to the trace memory by the signal of the control bus of the microprocessor 11 (404). The signal states or the converted signal states of the data bus, the address bus, and the control bus of the microprocessor 11 in the system to be tested are written into the trace memory 12 (405). The trigger comparison condition set previously by the control processor 18 and the signal or converted signal condition of the address bus, the data bus, and the control bus of the microprocessor in the system to be tested are compared by the trigger comparator (406). When these signals are coincident, the trigger signal is generated. This trigger signal, causes the memory control circuit 15 to inhibit the clock pulse to the address counter 14 and the write pulse to the trace memory 12 so that the write operation of the bus state is finished. In the trace memory 12, the bus state or the converted bus state of the microprocessor 11 before the trigger pulse is generated is stored. The stored bus state or the converted bus state is converted, by the control processor 18, to the hexadecimal code or mnemonic code of the microprocessor 11 of the system to be tested, and displayed only at predetermined lines on the region for displaying the content of the trace memory of the display portion 19 from the address of the trace memory set previously (410). Next, the internal register of the microprocessor is specified by the switches 22−1 to 22−n for specifying the internal register (411), and when the data search switch 23 is pushed (412), the control processor 18 reads, from the trace memory 12, the combination of the data in the trace memory 12 corresponding to the instruction in which the trace data now displayed on the bottom line of the display region of the content of the trace memory in the display portion 19 is included. That is, in FIG. 2A, it is assumed that, when the microprocessor 11 executed an instruction C, the combination of the data stored in the trace memory is DATA n−1, DATA n, and DATA n+1, and the data DATA n in the bottom line of the present display region is included in the combination of the data DATA n−1, DATA n, and DATA n+1 of the trace memory corresponding to the instruction C. Therefore, the control processor reads three data, i.e., DATA n−1, DATA n, and DATA n+1, from the trace memory 12 (413). When the microprocessor 11 executes the group of instructions by which the content of the internal register may be changed, the microprocessor 18 compares the combination of the data read out from the trace memory 12 and the combination of the data which will be stored in the trace memory 12 as the search data (414). That is, in FIG. 2A, it is assumed that, when the internal register x of the microprocessor 11 is specified, the instructions by which the register x may be changed are A, B, and when the instruction A is executed, the combination of the data stored in the trace memory 12 is DATA 1, DATA 2, and DATA 3, and when the instruction B is executed, the combination of the data stored in the memory 12 is DATA n−m and DATA n−m+1. Under such an assumption, the combination of the data DATA n−1, DATA n, and DATA n+1 is compared with the searched data. When these are not coincident, the combination of the data which is effected directly before the combination of the data already compared (such as DATA n−2, DATA n−3, etc., in FIG. 2A) is read from the memory 12 (417), and is compared until the combination of the data to be compared is found in the trace memory 12. When the data to be searched cannot be found in the trace memory 12, the display indicates that the data coincident with the combination of the data to be searched does not exist (420). When the data to be searched is found in the trace memory 12, the content of the trace memory is again displayed in such a manner that the combination of the data is placed on the bottom (lowest line) of the region for displaying the content of the trace memory in the display portion 19 (418). In FIG. 2A, as the data DATA n−m and DATA n−m+1 is the data combination found when the instruction B by which the internal register x may be changed is executed, it is displayed in such a manner that the DATA n−m+1 is placed on the bottom of the display portion, as shown in FIG. 2E.

Of course, as in the prior art, the picture can be shifted in parallel by, scrolling up or scrolling down, and, can be displayed in the region for displaying the content of the trace memory in the display portion, by inputting the address of the trace memory 12 from the setting condition input portion.

EFFECT OF THE INVENTION

As explained above, according to the present invention, any portion of the trace memory can be displayed by using the scrolling up switch or the scrolling down switch, or by inputting the address of the trace memory from the setting condition input portion. Additionally, by specifying the internal register of the microprocessor in the system to be tested and by operating the data search switch, the data can be displayed which is obtained when the microprocessor in the system to be tested has executed the instruction by which the specified internal register may be changed. Therefore, the user can obtain a displayed picture very simply, without the necessity of visually determining from the picture whether or not the data is the desired data.

We claim:

1. Apparatus for analyzing an operation of a microprocessor including:
    a memory which stores various signals of said microprocessor in a system to be tested;
    an address counter which specifies an address of said memory;
    a setting condition input apparatus for inputting various setting conditions;
    a trigger comparator for comparing said various signals of said microprocessor and a trigger condition set previously, and for generating a coincident pulse (a trigger signal) when said various signals and said trigger condition are coincident;
    a memory control circuit for outputting a write pulse to said memory in response to a start signal and a clock pulse to said address counter, and for receiving said conincident pulse (trigger signal) from said trigger comparator, so as to stop said write pulse to said memory and the output of said clock pulse to said address counter;

a display apparatus for displaying said various setting conditions input from said setting condition input apparatus and said various signals stored in said memory in a predetermined form;

a control processor for outputting said various setting conditions from said setting condition input apparatus to said trigger comparator and to said display apparatus, and for outputting an address of said memory, and for reading desired data from said memory so as to output said data to said display apparatus, and for outputting said start signal to said memory control circuit;

an address selection circuit for selecting an address to said memory from said control processor and an address to said memory from said address counter; and data switches connected to the input of said control process or for instructing a commencement of a data search operation.

2. Apparatus for analyzing an operation of a microprocessor comprising:

a memory for storing signal conditions in a data bus, an address bus and a control bus of said microprocessor in a system to be tested;

an address counter for generating an address of said memory;

an address selection circuit for selecting an address to said memory for specifying the desired data and an address to said memory from said address counter, and for supplying the selected address to said memory;

a setting condition input apparatus for inputting various setting conditions;

a trigger comparator for comparing said signal conditions and trigger condition set previously, and for generating a conincident pulse (a trigger signal) when said signal conditions and said trigger condition are conincident;

a memory control circuit for outputting a write pulse to said memory, an address selection signal to said address selection circuit and clock pulses to said address counter in response to a start signal and a control signal in the control signal in the control bus of the microprocessor, and which stops said write pulse, said address selection signal and said clock pulses when receiving said conincident pulse;

a display apparatus for displaying said various setting conditions input from said setting condition input apparatus and said signal conditions in the data bus, the address bus and the control bus of said microprocessor;

first switches for instructing a commencement of the data search operation;

second switches for specifying an internal register of said microprocessor of the system to be tested; and a control processor for supplying said trigger condition to said trigger comparator by input from said set condition input apparatus, for supplying the start signal to said memory control circuit by the instruction of commencement from said first switches, and for supplying the address of said memory to said address selection circuit by the instruction from said second switches, and for automatically searching, from the data stored in said memory, the data when the microprocessor of the system to be tested executes an instruction by which the specified internal registers are changed, and for outputting the searched data to said display apparatus.

3. Apparatus for analyzing an operation of a microprocessor comprising:

a memory for storing signal condition in a data bus, an address bus and a control bus of said microprocessor system to be tested;

an address counter for generating an address of said memory;

an address selection circuit for selecting an address to said memory for specifying the desired data and an address to said memory from said address counter, and for supplying the selected address to said memory;

a setting condition input apparatus for inputting various setting conditions;

a trigger comparator for comparing said signal conditions and trigger condition set previously, and for generating a coincident pulse (a trigger signal) when said signal conditions and said trigger condition are coincident;

a memory control circuit for outputting a write pulse to said memory, an address selection signal to said address selection circuit and clock pulses to said address counter in response to a start signal and a control signal in the control signal in the control bus of the microprocessor, and which stops said write pulse, said address selection signal and said clock pulses when receiving said coincident pulse;

a display apparatus for displaying said various setting conditions input from said setting condition input apparatus and said signal conditions in the data bus, the address bus and the control bus of said microprocessor;

switches for instructing a commencement of the data search operation;

a control processsor for supplying said trigger condition to said trigger comparator by input from said set condition input apparatus, for supplying the start signal to said memory control circuit by the instruction of commencement from said switches, and for supplying the address of said memory to said address selection circuit and for outputting the searched data to said display apparatus.

* * * * *

UNITED STATES PATENT AND TRADEMARK OFFICE
CERTIFICATE OF CORRECTION

PATENT NO. : 4,611,281
DATED : September 9, 1986
INVENTOR(S) : Shouichi Suko and Hirohisa Hoshino It is certified that error appears in the above—identified patent and that said Letters Patent is hereby corrected as shown below:

Column 7, line 19, "process or" should be "processor".

Column 8, line 17, "condition" should be "conditions".

Column 8, line 19, after "processor" and before "system", insert the words -- in a --.

Signed and Sealed this

Twenty-seventh Day of January, 1987

*Attest:*

DONALD J. QUIGG

*Attesting Officer*    *Commissioner of Patents and Trademarks*